United States Patent Office 3,236,901
Patented Feb. 22, 1966

3,236,901
ALLENIC ALCOHOLS AND PROCESS OF MANUFACTURING THEM
Benjamin Thompson, Kingsport, Tenn., assignor to Eastman Kodak Company, Rochester, N.Y., a corporation of New Jersey
No Drawing. Original application Dec. 13, 1960, Ser. No. 75,475. Divided and this application Aug. 22, 1963, Ser. No. 307,280
8 Claims. (Cl. 260—617)

This application is a division of my U.S. application, Serial No. 75,475, filed December 13, 1960, entitled, "Allenic Compounnds And Process of Manufacturing Them," which is a continuation-in-part of my U.S. application, Serial No. 861,750, filed December 24, 1959, and now abandoned.

This invention relates to compounds having two adjacent carbon-carbon double bonds such as are found in allene, and to a process for making them. More specifically, it relates to compounds having the functional group,

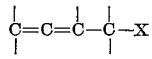

wherein X is —CHO, —COOH, or —CH$_2$OH; and to a process for their preparation.

My invention is based on the discovery that when certain aldehydes having at least two carbon atoms per molecule are heated with an acetylenic alcohol in the presence of an acidic catalyst reaction occurs with an unexpected molecular rearrangement that results in the formation of a novel type of allenic aldehyde having a characteristic functional group,

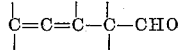

The basic reaction of my process is believed to be a fundamentally new discovery and is applicable to a wide range of different aldehyde and acetylenic alcohol starting materials. I have demonstrated the reaction most extensively in preparing novel 3,4-dienaldehydes of the formula:

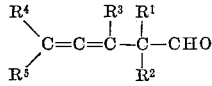

wherein $R^1$ and $R^2$ are alkyl groups or cycloalkyl groups; and $R^3$, $R^4$ and $R^5$ are hydrogen or alkyl or cycloalkyl groups. The reaction by which aldehydes of the above formula are prepared in accordance with my invention is believed to proceed through the formation of an intermediate enol ether type of compound which rearranges to the allenic aldehyde form, as illustrated by the following equation:

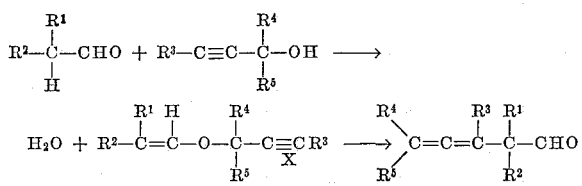

Although I do not wish to be bound by theoretical explanations of the results I have obtained, all of the reactions in accordance with the invention that I have observed are consistent with the formation of an enol ether intermediate. The postulated equation above therefore provides a means for defining the aldehydes that can be used. Thus, I have found that only aldehydes of two or more carbon atoms per molecule that are capable of forming an enol ether with an acetylenic alcohol as in the equation will produce the novel allenic aldehydes.

Aldehydes suitable for the reaction have at least two carbon atoms per molecule. In the broadest aspect $R^1$ and $R^2$ of the aldehyde in the above equation can be hydrogen or various radicals, including alkyl, cycloalkyl, alkaryl, alkenyl or other substituents that will not interfere with the reaction of the aldehyde and acetylenic alcohol in forming the enol ether and the propargylic rearrangement to the allenic aldehyde.

The principal aldehydes suitable for the reaction are aldehydes of at least four carbon atoms that have a single hydrogen atom on the alpha carbon atom. If the aldehyde has two hydrogen atoms on the alpha carbon atom the rearrangement reaction can take place twice, yielding a diallenic substituted aldehyde which is easily lost by polymerization or condensation reactions.

Aldehydes having no hydrogen atom on the alpha carbon are suitable if there is available elsewhere in the molecule a hydrogen atom that can be split off in forming the postulated enol ether intermediate. However, the most important class of aldehydes are the aldehydes having one hydrogen atom on the alpha carbon atom. Examples include 2-alkyl aliphatic aldehydes such as isobutyraldehyde, 2-methylbutyraldehyde, 2-ethylbutyraldehyde, 2-ethylpentanaldehyde, 2-methylhexanaldehyde, 2-ethylhexanaldehyde, 2-methlpentanaldehyde, 2-ethyl-4-methylpentanaldehyde, 2,4-dimethylpentanal; and cyclic aldehydes such as cyclohexanecarboxaldehyde, cyclopentanecarboxaldehyde, and norbornanecarboxaldehyde. Thus, the cyclic aldehydes include aldehydes in which $R^1$ and $R^2$ are alkylene groups which, together with the alpha carbon atom to which they are attached, form a carbocyclic ring.

The acetylenic alcohols suitable for my process include propargyl alcohol and substituted propargyl alcohols of the following structure:

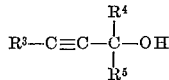

wherein $R^3$, $R^4$ and $R^5$ can be hydrogen, alkyl, cycloalkyl, alkaryl, alkenyl, or other non-interfering substituents, $R^4$ and $R^5$ can be alkylene groups that form a carbocyclic ring with the carbon to which they are attached.

Examples of suitable alcohols include propargyl alcohol; α-substituted propargyl alcohols in which $R^3$ of the above formula is hydrogen and $R^4$ and $R^5$ are either hydrogen or lower alkyl groups, e.g., 3-methyl-1-pentyn-3-ol, 3-methyl-1-butyn-3-ol, 1-hexyn-3-ol, 4-ethyl-1-octyn-3-ol, and 3-methyl-1-nonyne-3-ol; and α-substituted propargyl alcohols in which $R^4$ or $R^5$ is a cycloalkyl substituent such as 1-ethynyl cyclohexanol, 1-ethynyl cyclopentanol, and 2,2,6-trimethyl-1-ethynylcyclohexanol. Although acetylenic alcohols having substituents on both acetylenic carbon atoms, i.e., $R^3$ is alkyl, cycloalkyl, etc., are scarce and expensive there is no reason that such alcohols cannot be used satisfactorily in my process and therefore allenic compounds prepared from such alcohols are within the scope of the invention.

I have found that 3,4-dien-1-als can be prepared by heating the selected aldehyde with the propargyl alcohol or substituted propargyl alcohol in the liquid phase in the presence of an acidic catalyst. Virtually any type of acidic material will catalyze the reaction. Examples are: phosphoric acid, toluene-sulfonic acid, methionic acid, boron trifluoride, acidic ion exchange resins, etc. The reaction will take place without the addition of any acid other than the trace amounts which may be present in the aldehyde used. When lower aldehydes such as isobutyraldehyde are being reacted, it is helpful to increase the reaction temperature either by the use of moderately elevated pressure or by the addition of a high boiling solvent such as diisopropyl benzene, cymene, etc.

The reaction can also be carried out as a continuous vapor phase process in the presence of a solid catalyst. This procedure has the advantage that secondary reactions can be minimized and the need for separating the acidic catalyst from the products is avoided. Catalysts include materials such as silica gel, fuller's earth, and activated carbon. Better results are obtained by impregnating such materials with acidic compounds such as $MnSO_4$, $ZnSO_4$, $CaCl_2$, $Al_2(SO_4)_3$, $MgSO_4$, etc. Such impregnating materials can include other materials that will impart acidity to the catalyst such as acidic ions derived from phosphorous, arsenic, vanadium, tungsten, molybdenum and the like, either as free acid or in salt form.

Promoted catalysts as described above are conveniently prepared by impregnation of the support with a solution or dispersion containing sufficient acidic constituent to give a concentration of the promoting ingredient of from about 0.1% to about 25% by weight of the catalyst following evaporation of the solvent.

The vapor phase reaction will take place at a temperature as low as 125° C. but temperatures as high as about 450° C. can be used. Contact times vary inversely to the temperature and may be in the range of about one minute to a small fraction of a second.

My invention is illustrated but not limited by the following examples of preparation of allenic aldehydes:

*Example 1.*—A solution of 280 g. (5 moles) of propargyl alcohol, 504 g. (7 moles) of isobutyraldehyde, 1.0 g. of p-toluenesulfonic acid, and 200 g. of diisopropyl benzene was heated in a fractionating still having means for removing water at the head. 95 g. of water was removed over a period of 30 hrs. The charge was then fractionated. More than 220 g. of 2,2-dimethyl-penta-3,4-dien-1-al was recovered. B.P. 131° C., $n_D^{20}$ 1.4531. Infrared analysis showed that there was no conjugated unsaturation present but that allenic unsaturation was present (absorption at 5.1 microns). Nuclear magnetic resonance showed that there were the correct number and intensities of hydrogen protons present to agree with the structure $CH_2{:}C{:}CH{-}C(CH_3)_2CHO$.

*Analysis.*—Theoretical: C, 76.32; H, 9.15; O, 14.53. Found: C, 75.85; H, 9.19; O, 14.96. Carbonyl equivalent weight 111 (theory 110.15). Reduction of the product, resulting in its taking up 3 molecules of hydrogen, gave 2,2-dimethylpentanol, B.P. 156° C., $n_D^{20}$ 1.4259.

*Example 2.*—A solution of 1,720 g. of 2-methyl butyraldehyde, 1,120 g. of propargyl alcohol, 1 g. of methionic acid, 1 g. of hydroquinone, and 160 cc. of benzene was boiled in a still topped by a reflux condenser and water separator. After 360 cc. of water had separated, 1 g. of sodium bicarbonate was added. Fractionation at atmospheric and reduced pressure separated 2-ethyl-2-methyl-penta-3,4-dien-1-al, B.P. 92° C. at 100 mm., $n_D^{20}$ 1.4603. Infrared analysis showed this aldehyde to have a strong absorption at 5.1 microns, which is characteristic of the C:C:C structure.

*Example 3.*—Substituting equal moles of 2-ethylhexanaldehyde for 2-methylbutyraldehyde in Example 2 produced 2-butyl-2-ethyl-penta-3,4-dien-1-al, B.P. 210° C.

*Example 4.*—Substituting 2-methyl-pentanaldehyde for 2-methyl-butyraldehyde in Example 2 produced 2-methyl-2-propyl-penta-3,4-dien-1-al, B.P. 175° C.

*Example 5.*—A solution of 740 g. of isobutyraldehyde, 981 g. of 3-methyl-1-pentyn-3-ol, 1 g. of methionic acid and 100 ml. of benzene was refluxed until 186 cc. of water separated at the head of the column. 1 g. of sodium acetate and 0.1 g. of hydroquinone were added, and the charge was fractionated to recover over 400 g. of 2,2,5-trimethyl-hepta-3,4-dien-1-al, B.P. 99.5° C. at 52 mm., $n_D^{20}$ 1.4580, and having a strong infrared absorption at 5.1 microns showing the presence of the C:C:C group.

Likewise, 3-methyl-1-butyn-3-ol gave 2,2,5-trimethyl-hexa-3,4-dien-1-al, B.P. 99° C. at 104 mm., $n_D^{20}$ 1.4550.

Likewise, 1-hexyn-3-ol gave 2,2-dimethyl-octa-3,4-dien-1-al, B.P. 89–90° C. at 22 mm., $n_D^{20}$ 1.4590–1.4595.

Likewise, 4-ethyl-1-octyn-3-ol gave 2,2-dimethyl-6-ethyl-deca-3,4-dien-1-al, B.P. 88° C. at 2.0 mm., $n_D^{20}$ 1.4629–1.4632.

Likewise, 3-methyl-1-nonyne-3-ol gave 2,2,5-trimethyl-undeca-3,4-dien-1-al, B.P. 78° C. at 0.8 mm., $n_D^{20}$ 1.4607–1.4610.

Preparation of allenic aldehydes having cyclic substituents is shown by the following examples:

*Example 6.*—Preparation of 3-butenaldehyde, 4-cyclohexylidene-2,2-dimethyl: The following materials were charged to a still having means for decanting water that separates at the head: 19.8 g. of 1-ethynyl cyclohexanol, 230 g. of isobutyraldehyde, 10 g. of benzene, 0.1 g. of p-toluenesulfonic acid, and 0.3 g. of hydroquinone. This charge was refluxed rapidly under a nitrogen atmosphere until 32 g. of water layer separated at the head of the column. This required 74 hr. but may be shortened by increasing the catalyst concentration, etc. The product was then fractionated under vacuum to recover excess isobutyraldehyde, 27 g. of unreacted 1-ethynyl cyclohexanol, 22.1 g. of the allenic aldehyde, 4 - cyclohexylidene-2,2-dimethyl-3-butenaldehyde, B.P. 94° C. at 2.2 mm., $n_D^{20}$ 1.4915.

*Analysis.*—NMR and infrared absorptions are in agreement with structure. Found: 80.59% C, 10.24% H (theory, 80.84% C, 10.18% H).

Likewise, 1-ethynyl cyclopentanol has been reacted with isobutyraldehyde to prepare 4 - cyclopentylidene-2,2-dimethyl-3-butenaldehyde, and with other aldehydes to give similar allenic aldehydes.

*Example 7.*—Preparation of 2-norbornanecarboxaldehyde, 3-methyl-2-propadienyl: Charge consisted of 1414 g. of 2-norbornanecarboxaldehyde, 3-methyl, 168 g. of propargyl alcohol, 30 g. of benzene, and 0.5 of p-toluenesulfonic acid. The charge was refluxed in a still under a nitrogen atmosphere until 54 cc. of water had been decanted at the head. Vacuum fractionation of the product gave mainly two isomers of 2-norbornanecarboxaldehyde, 3-methyl-2-propadienyl, B.P. 96° C. at 5.2 mm. and 70° C. at 1.1 mm., $n_D^{20}$ 1.5153 and 1.5183. Infrared analysis confirmed the presence of the propadienyl group in both.

Likewise, cyclohexane carboxaldehyde and cyclopentane carboxaldehyde were reacted with propargyl alcohol to produce the corresponding propadienyl substituted aldehydes, 1-propadienyl-cyclohexane carboxaldehyde and 1-propadienylcyclopentane carboxaldehyde.

Preparation of a 3-substituted 3,4-dienal from a substituted propargyl alcohol in which $R_3$ is a lower-alkyl group is illustrated by the next example.

*Example 8.*—A solution of 200 g. of 2-butyn-1-ol, 366 g. of 2-ethyl hexanaldehyde, 0.1 g. hydroquinone, 0.15 g. of p-toluenesulfonic acid and 50 g. of benzene were refluxed in a still having means for separating water at its head until 52 g. of water had separated. Fractionation of the charge under reduced pressure produced 273 g. of 3,4-pentadienal, 2-butyl-2-ethyl-3-methyl, B.P. 80° C. at 4 mm. Infrared shows the characteristic absorption for C=C=C at 5.1 microns.

Although aldehydes having one hydrogen atom attached to the alpha carbon atom are the preferred reactants for my process, I have indicated that the reaction can be carried out with aldehydes having no hydrogen atom on the alpha carbon atom, provided that the aldehyde can rearrange by a simple double bond shift to a structure that will permit the enol ether to be formed. The following example demonstrates the reaction with an α,β-unsaturated aldehyde which can rearrange to provide a hydrogen atom on the alpha carbon atom by a simple double bond shift.

*Example 9.*—A solution of 294 g. of 3-methyl-1-pentyn-3-ol, 384 g. of 2-ethyl-2-hexenaldehyde, 0.15 g. of p-toluene sulfonic acid, 0.1 g. of hydroquinone, 50 g. of benzene, and 25 g. of toluene were refluxed in a still, having means for separating water at the head, for 68 hours. During this time, when water separation slowed down, a total of 0.4 g. of the acid catalyst was added and 2.0 moles of water were separated. The catalyst was neutralized with NaHCO$_3$. Fractionation of the crude product isolated 185 g. of 3,4-heptadienal, 2-(1-butenyl)-2-thyl-5-methyl, B.P. 72° C. at 0.8 mm., $n_D^{20}$ 1.4780–8. This represents a 69% yield based on the 33% of the 3-methyl-1-pentyn-3-ol not recovered in the fractionation of products. Infrared and NMR analyses show that the 1-butenyl group is the trans-isomer.

The use of another unsaturated aldehyde is demonstrated in the next example. The aldehyde is tetrahydrobenzaldehyde, an aldehyde in which R$^1$ and R$^2$, together with the alpha carbon atom of the aldehyde, form a cycloalkenyl radical.

*Example 10.*—A solution of 123 g. of tetrahydrobenzaldehyde, 65 g. of propargyl alcohol, 20 g. of p-xylene, 50 g. of benzene, and 0.1 g. of p-toluene sulfonic acid was refluxed until 17 g. of water separated. The base temperature rose from 125 to 163° C. in this period. The catalyst was neutralized with sodium bicarbonate and the crude product was fractionated. 25 g. of 1-propadienyl tetrahydrobenzaldehyde product, B.P. 54 ± 5° C. at 0.8 mm., $n_D^{20}$ 1.5120–30, was obtained. Infrared analysis confirms the presence of the functional groups. Tetrahydrobenzaldehyde dipropargyl acetal, B.P. 79° C. at 0.7 mm., $n_D^{20}$ 1.4910, was obtained as a by-product.

The synthesis of 3,4-dienaldehydes as described in prior examples in some cases produces a 3,5-dienaldehyde by-product. This very likely is produced by isomerization of the 3,4-dienal. Its formation is enhanced by prolonged heating, higher catalyst concentrations, and reaction temperatures. Example 11 describes a run from which a 10% yield of the 3,5-dienal was isolated.

*Example 11.*—A solution of 350 g. of 2-methyl-3-butyn-2-ol, 222 g. of isobutyraldehyde, 15 g. of benzene, and 0.3 g. of p-toluene sulfonic acid was refluxed in a still (as described in prior examples) for 64 hours removing water at the still head. In this time the base temperature rose from 80 to 140° C. The crude product was fractionated. In addition to 152 g. of 3,4-hexadienal-2,2,5-trimethyl, B.P. 83° C. at 52 mm., $n_D^{20}$ 1.4572, there was obtained 60 g. of 3,5-hexadienal-2,2,5-trimethyl, B.P. 95–97° C. at 52 mm., $n_D^{20}$ 1.4710–30, and 18.5 g. of 1,2,4-trimethylbenzene.

Dienaldehydes can be prepared in accordance with the invention by heating the mixture of aldehyde and acetylenic alcohol under pressure at 125–200° C. for several hours. This can be useful especially in a continuous process. In one form of the process the solution of aldehyde, alcohol, catalyst, etc. is pumped into a tube heated to the reaction temperature and of such length and volume as to provide the desired reaction time, e.g., several minutes or hours. The liquid reaction products are continuously discharged at the other end of the tube into a fractionating still where the aldehyde, water, and unreacted alcohol are separated from the dienal and other products. The unreacted aldehyde and alcohol are recirculated. The dienaldehyde is isolated by further distillation. One advantage of such a process is that it reduces the amount of heat required to carry out the reaction under reflux conditions.

Example 12 demonstrates the synthesis of dienals at elevated pressure, as developed autogenously in a heated autoclave.

*Example 12.*—A solution of 144 g. of isobutyraldehyde, 84 g. of propargyl alcohol, 100 g. of p-xylene, 0.2 g. of hydroquinone, and 0.15 g. of phosphoric acid was charged to an autoclave and heated for 8 hours at 175° C. Analysis of products gave 9 g. of 2,2-dimethyl-3,4-pentadienal representing a 50% yield on the propargyl alcohol that reacted. Heating at 200° C. more than doubled the conversion to the dienal.

Vapor phase preparation of an allenic aldehyde is illustrated by the following example:

*Example 12a.*—During a period of 3 hr., a mixture consisting of 173 g. (2.4 moles) of isobutyraldehyde, 67.3 g. (1.2 moles) of propargyl alcohol, and 4.9 moles of nitrogen was passed over activated carbon (Carbide and Carbon Chemicals Corporation Columbia Grade CXAL) at a temperature of 200° C. and a contact time of 19.2 seconds. (Contact time is defined as the time in seconds that one volume of gaseous feed is in contact with an equal volume of catalyst at reaction conditions of temperature and pressure.) The organic reaction product, 230 g., was collected in traps cooled to 10° C. and −80° C. Analysis of the organic product showed 0.1 mole of 2,2-dimethyl-3,4-pentadienal and 1.08 moles of unreacted propargyl alcohol corresponding to a conversion to the dienal of 8.3% based on the alcohol fed and a yield of 83.4% based on the alcohol consumed.

As I have indicated, my invention extends to the preparation of derivatives of the allenic aldehyde prepared in accordance with the invention, including allenic acids and allenic alcohols prepared from such aldehydes as intermediates.

Examples of specific valuable allenic alcohols that can be prepared in accordance with the invention include: 2,2-dimethylpenta - 3,4-dienol; 2,2,5-trimethylhepta-3,4-dienol; 2 - ethyl - 2 - methylpenta - 3,4-dienol; 2-methyl-2-propylpenta-3,4-dienol; 2-butyl - 2 - ethylpenta-3,4-dienol; 2,2,5-trimethylhexa-3,4-dienol; 2-allenyl-3-methylbicyclo [2,2,1]heptane methanol; 4-cyclohexyliden-2,2-dimethyl-3-butanol; 2,2-dimethylocta-3,4-dienol; 2-butyl-2-ethyl-5-methylhexa-3,4-dienol; 2-butyl-2-ethylocta-3,4-dienol; and the alcohols of other dienals as disclosed above.

The method of preparation of the alcohols comprises initially the preparation of the allenic aldehyde by the propargylic rearrangement described above. The aldehyde is then reduced to an allenic alcohol of the same number of carbon atoms without saturating the adjacent double bonds. Methods for reduction of unsaturated aldehydes to alcohols are known in the art. These include disproportionation, electrolytic reduction, use of nascent hydrogen prepared by the action of acids on metals, use of amalgams, lithium aluminum hydride, boron compounds, aluminum alkoxides as in Meerwein-Ponndorf-Verley reduction, etc.

The following examples illustrate preparation of allenic alcohols in accordance with the invention:

*Example 13.*—120 g. of sodium hydroxide in 50% aqueous solution was slowly added to a solution of 110 g. of 2,2-dimethyl-penta-3,4-dien-1-al and 100 cc. of 37% formalin in 400 g. of methanol. After stirring at 60° C. for 2 hours, water was added and the methanol distilled. Benzene extraction and fractionation produced over 100 g. of 2,2-dimethyl-penta-3,4-dien-1-ol, B.P. 83° C. at 40 mm., $n_D^{20}$ 1.4712–8.

*Example 14.*—165 g. of 2,2-dimethylpenta-3,4-dienaldehyde and 500 g. of methanol were charged to a stirred vessel. 90 g. of sodium hydroxide was added over an hour while holding the temperature at 60–65° C. The solution was agitated for 3 hours or until all aldehyde had reacted. 1,500 cc. of water were added and the methanol was removed by distillation. The solution was extracted with benzene to remove the alcohol completely. This solution was then fractionated to recover over 70 g. of an alcohol which has been identified as 2,2-dimethyl-penta-3,4-dienol. B.P. 80–83° C. at 40 mm., $n_D^{20}$ 1.4708±5. Acidification of the alkaline solution liberated the corresponding acid.

*Example 15.*—84 g. of potassium hydroxide was dissolved in 50 g. of water and 250 g. of methanol and warmed to reflux in a vessel with an agitator. 152 g. of 2,2,5-trimethylhepta-3,4-dienal dissolved in 150 g. of methanol was fed in over an hour. Refluxing was continued until the aldehyde concentration was negligible. 1,500 g. of water was added and the methanol was distilled off. The 2,2,5-trimethylhepta-3,4-dienol was then either separated by steam or azeotropic distillation or by extraction using benzene. Redistillation produced over 65 g. of the alcohol. B.P. 94° C. at 16 mm. The presence of the allenic group was established by infrared absorption at 5.1 microns.

I have also prepared allenic alcohols in accordance with the invention by a hydrogen transfer reaction, which is preferred in some cases to the Cannizzaro reaction described above. The method of preparation is illustrated by the following examples.

*Example 16.*—2,400 g. (40 moles) of dry isopropanol, 761 g. (5 moles) of 2,2-dimethyl-3,4-octadienaldehyde, and 2 g. of hydroquinone were charged to a fractionating still. After heating to reflux under a nitrogen atmosphere and checking to determine that there was no water present, 10 g. of Aluminum Chelate PEA-1 was added as catalyst. (Aluminum Chelate PEA-1, a product of Harshaw Chemical Co., is a derivative of aluminum isopropylate in which one isopropoxide group is replaced by ethylacetoacetate.) The isopropanol was gradually oxidized to acetone and the dienal reduced to its alcohol. The still takeoff was regulated to 70° C. and the acetone was removed as it formed. 30 g. of additional catalyst was added over the course of 8 hours. When acetone no longer separated at the still head, the excess isopropanol was distilled off. The alcohol product, 2,2-dimethylocta-3,4-dien-1-ol, was isolated in 82% yield by fractionation under reduced pressure, $n_D^{20}$ 1.4721, B.P. 74–75° C. at 1.2–1.3 mm.

*Example 17.*—2,2-dimethyl - 6 - ethyl-3,4-decadienaldehyde was reduced to 2,2-dimethyl-6-ethyldeca-3,4-dien-1-ol in the same manner as above, using a similar excess of isopropanol. A 96.5% yield of the alcohol was obtained, B.P. 105° C. at 1.1 mm. pressure, $n_D^{20}$ 1.4729.

*Example 18.*—To 800 g. (4.5 moles) of 2,2-dimethyl-4-cyclohexylidene-3-butenaldehyde, 3,000 g. of dry isopropanol, and 2 g. of hydroquinone was added 22 g. of aluminum isopropoxide in 100 g. of toluene. Upon heating in a fractionating still, acetone separated and was removed at the head. Four and five-tenths moles of acetone were removed in 2 hr. and tests showed the aldehyde to be consumed. After distilling off the excess isopropanol, 734 g. of the product alcohol, 2,2-dimethyl-4-cyclohexylidene-3-butenol, was obtained (90% yield), B.P. 81° C. at 0.5 mm., $n_D^{20}$ 1.5031.

*Example 19.*—In a manner similar to the preceding example, 2,2,5-trimethyl - 3,4 - heptadienaldehyde was reduced to 2,2,5-trimethyl-3,4-heptadienol, using excess isopropanol and aluminum isopropoxide as catalyst. In this case the catalyst salts were filtered from the crude alcohol. A 75% yield was obtained, B.P. 82° C. at 9 mm., $n_D^{20}$ 1.4712.

*Example 20.*—2,2,5-trimethyl - 3,4 - undecadienol was prepared by the Cannizzaro reaction from 2,2,5-trimethyl-3,4-undecadienaldehyde. 832 g. (4 moles) was added to 320 g. of sodium hydroxide dissolved in 320 g. of water and 1,000 g. of methanol and refluxed until the aldehyde was almost completely reacted. Methanol was partly distilled off and toluene was added to help separate the alcohol from the aqueous layer. Fractionation of the organic layer produced 408 g. of 96% pure alcohol, $n_D^{20}$ 1.4706. Analysis of the alcohol by nuclear magnetic resonance gave a pattern in agreement with its structure.

The hydrogen transfer reaction illustrated by the above examples may be carried out using a wide range of molar ratios of alcohol to 3,4-dienal. Naturally, at least 1 mole of alcohol is required per mole of aldehyde. If less is used the reaction will go until all of the alcohol is oxidized. In addition to the isopropanol shown, any alcohol that can be oxidized to form an aldehyde or ketone may be used (tertiary alcohols cannot be). Even alcohols whose aldehydes or ketones boil higher than the dienal can be used. In this case the reaction is carried to an equilibrium and worked up or else a continuous methyl esterification apparatus is used so that the higher boiling aldehyde or ketone can be separated from the reaction.

In addition to the aluminum isopropoxide and aluminum chelate PEA, shown in examples, other metal alkoxides such as lithium, sodium, potassium, magnesium, stannic, zirconium, titanium, etc. may be used. Likewise, other alcohols may be used to form the alkoxide.

Temperature of the reduction may be varied as convenient for separation of the ketone or aldehyde formed. If the temperature is over 150° C. isomerization of the 3,4-dienol to 3,5-dienol may take place. Where $R_4$ or $R_5$ is hydrogen, some isomerization to 2,4-dienols and/or dehydration to olefins may take place at reaction temperatures above 100° C.

In addition to the liquid phase hydrogen transfer method of reducing the 3,4-dienaldehydes to 3,4-dienols, this reaction may be carried out in the vapor phase under conditions essentially as described in U.S. Patent 2,767,211.

The 3,4-dienaldehydes may be isomerized to the 3,5-dienaldehydes or partially hydrogenated to the 3- or 4-olefinic aldehydes. All of these may be reduced by the described hydrogen transfer method by merely substituting these aldehydes for the 3,4-dienaldehydes described in the examples on a mole for mole basis.

The allenic alcohols of the invention prepared as described above have a number of important uses. Some of the alcohols and their esters have pleasant odors and can be used in the formulation of perfumes and flavors or as insect attractants in insecticides.

The allenic acids of the invention are also prepared from the allenic aldehydes obtained by the propargylic rearrangement. Examples of acids that can be prepared in accordance with the invention from such allenic aldehydes include: 2,2 - dimethylpenta - 3,4 - dienoic acid; 2,2,5 - trimethylhepta - 3,4 - dienoic acid; 2 - ethyl - 2 - methylpenta - 3,4 - dienoic acid; 2 - methyl - 2 - propylpenta - 3,4 - dienoic acid; 2 - butyl - 2 - ethylpenta - 3,4 - dienoic acid; 2,2,5 - trimethylhexa - 3,4 - dienoic acid; 2 - allenyl - 3 - methylbicyclo - [2,2,1]heptane - 2 - carboxylic acid; and 4 - cyclohexyliden - 2,2 - dimethyl - 3-butenoic acid.

The acids are prepared by oxidizing the allenic aldehydes. Methods for oxidation of aldehydes to acids, either by use of oxidizing agents or catalytically with air or oxygen are well known in the art. However, in the present process care must be taken to avoid reaction of the double bonds if monobasic acids are desired. Preparation of the acids by disproportionation of the aldehyde, by an oxidizing agent and catalytically with air are described in the following examples.

*Preparation of acid by the Cannizzaro reaction*

*Example 21.*—120 g. of sodium hydroxide in 50% aqueous solution was slowly added to a solution of 110 g. of 2,2 - dimethyl - penta - 3,4 - dien - 1 - al in 500 cc. of methanol. After stirring at 60° C. for 2 hours, water was added and the allenic alcohol was extracted with benzene. Fractionation separated over 50 g. of 2,2 - dimethyl - penta - 3,4 - dien - 1 - ol, B.P. 83° C. at 40 mm., $N_D^{20}$ 1.4712±5. Acidification of the alkaline solution with acid, followed by benzene extraction and distillation, gave over 50 g. of 2,2 - dimethylpenta - 3,4 - dienoic acid, B.P. 67–70° C. at 1.0–1.1 mm., $n_D^{20}$ 1.4669.

*Example 22.*—84 g. of potassium hydroxide was dissolved in 50 g. of water and 250 g. of methanol and warmed to reflux in a vessel with an agitator. 152 g. of 2,2,5 - trimethylhepta - 3,4 - dienaldehyde dissolved in 150 g. of methanol was fed in over a 1-hour period. Refluxing was continued until aldehyde concentration was negligible. 1500 cc. of water was added and most of the methanol was distilled off. The byproduct 2,2,5 - trimethylhepta - 3,4 - dienol was then either separated by steam or azeotropic distillation, or extracted and then recovered. In either case all non-acidic products were separated from the alkaline solution by extraction. The alkaline salt solution was then acidified with sulfuric acid. The 2,2,5 - trimethylhepta - 3,4 - dienoic acid was separated and washed and fractionated to recover 77 g. of acid. Acid purified by redistillation had the following properties: neut. equiv. 169.5; theory 168.2; mol. wt. 170; B.P. 80–85° C. at 0.8 mm. Infrared confirmed a strong absorption characteristic of the C=C=C structure at 5.1 microns.

*Preparation of acid by use of an oxidizing agent*

*Example 23.*—A suspension of silver oxide was prepared by precipitating it from 340 g. of silver nitrate in 2 liters of water with 80 g. of sodium hydroxide in a vessel having agitation. The alkalinity was adjusted to pH of 11. One mole, 110 g., of 2,2-dimethylpenta-3,4-dienal was slowly fed into the slurry over a 6-hour period holding the temperature below 25° C. During this time the alkalinity of the slurry was maintained at pH 10–12 by the gradual addition of dilute sodium hydroxide. The slurry was held at pH 12 until the reaction was complete and all the aldehyde had been oxidized. The salt was filtered from the silver. The solution was extracted with benzene to remove any organic byproducts as impurities. It was was then acidified using excess sulfuric acid. The dienoic acid was separated, the last being extracted with benzene, and fractionated to recover 115 g. of 2,2 - dimethylpenta - 3,4 - dienoic acid; B.P. 57° C. at 0.5 mm. pressure, neut. equiv. 126.8 Analyzing: C, 67.03%, H, 8.12% (theory: C, 66.67%, H, 7.94%). Infrared analysis confirmed the presence of a —C=C=C— group by a strong absorption at 5.1 microns.

Like wise, 2,2 - dimethylocta - 3,4 - dienal gave 2,2 - dimethylocta - 3,4 - dienoic acid, B.P. 97° C. at 0.8 mm., $n_D^{20}$ 1.4694.

Likewise, 2 - butyl - 2 - ethyl - 5 - methylhexa - 3,4 - dienal gave 2 - butyl - 2 - ethyl - 5 - methylhexa - 3,4 - dienoic acid, B.P. 110–125° C. at 0.6–1.0 mm. All three of these acids show absorption at 5.1 microns by infrared, thus confirming the presence of the allene group.

*Preparation of acid by catalytic oxidation*

*Example 24.*—A half gram of cobalt acetate hydrate was dissolved in 200 g. of acetic acid. This solution was placed in a 1″ x 5′ glass column provided with means to disperse air into its base and surmounted by a condenser. 5 cc. of acetaldehyde were dissolved in the above solution and then a slow stream of air containing 9 g. of acetaldehyde vapor per cubic foot was dispersed through it. The temperature rose and after 10–30 minutes the solution took on the characteristic dark green color of an active oxidation catalyst. At this point 2,2 - dimethylpenta - 3,4-dienal was fed into the tower near its base at the rate of 11 g. per cubic foot of air (containing acetaldehyde) passed into the tower. The temperature was held between 15° and 50° C. by cooling. After 220 g. of dimethylpentadienal had been reacted, the flow of air was discontinued and the solution was gradually warmed to 100° C. over 4 hr. to slowly decompose peroxy compounds. It was then cooled and treated with ferrous sulfate until the peroxygen content was negligible. 400 g. of xylene were added and the acetic acid was distilled off under low vacuum. The remaining acid was converted to its sodium salt using 10% sodium hydroxide. The organic byproducts were extracted from the aqueous salt solution. This was then acidified to pH 2, the liberated acid extracted with xylene and fractionated under vacuum. A 15% yield of acid, B.P. 55° C. at 0.5 mm. was obtained.

The allenic acids prepared in accordance with the invention as described above have many important uses. They are principally useful as intermediates in the preparation of valuable derivatives such as esters and salts. Thus, esters of a number of the allenic acids have pleasant odors and are useful in the formulation of flavors and perfumes. The metal salts of these acids, such as the lead, cobalt or manganese salts, are useful as paint driers.

Preparation of a valuable derivative of an allenic acid in accordance with the invention is described in the following example, such derivative also aiding in identifying the structure of the acid.

*Example 25.*—*Dibromo-2,2-dimethylpentenoic acid:* A solution of bromine in carbon tetrachloride was added to a 20% solution of 2,2-dimethylpenta-3,4-dienoic acid in carbon tetrachloride at 25° C. until the solution maintained the characteristic bromine color. The CCl₄ was evaporated and the residue was recrystallized from heptane. The dibromo acid had the following analysis: B.P. 117–121° C.; neut. equiv. 283.1 (286 theory); C, 28.95%; H, 3.70%; O, 10.91%; Br 55.47% (theory: 29.37%, 3.50%, 11.19%, and 55.94%, respectively). Infrared confirmed positively the presence of C=C and —COOH.

A surprising result of the above example is that a dibrome rather than a tetrabromo derivatives was obtained. Thus, the allenic acids of the invention can be reacted with a halogen such as bromine to obtain a halogenated unsaturated acid, the latter being useful as an intermediate in production of further substituted mono-olefinic acids and acid derivatives.

As compounds of the invention, and as the aldehydes and acetylenic alcohols from which they are prepared, in which $R^1$, $R^2$, $R^4$ and $R^5$ are defined in the claims hereinafter as cycloalkyl radicals, I mean to include compounds in which either $R^1$ and $R^2$ or $R^4$ and $R^5$, or both of such pairs, are alkylene groups that form a carbocyclic ring with the carbon atom to which they are attached.

The invention has been described in considerable detail with particular reference to certain preferred embodiments thereof, but it will be understood that variations and modifications can be effected within the spirit and scope of the invention as described hereinabove, and as defined in the appended claims.

I claim:

1. An allenic alcohol of the formula

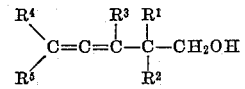

wherein $R^1$ represents a member selected from the group consisting of a lower alkyl radical and a lower alkenyl radical, $R^2$ represents a lower alkyl radical and wherein $R^1$ and $R^2$ together with the alpha carbon atom to which they are attached can be a member selected from the group consisting of cyclopentyl, cyclohexyl, cyclohexenyl and norbornanyl, $R^3$, $R^4$, and $R^5$ each represents a member selected from the group consisting of hydrogen and a lower alkyl radical and wherein $R^4$ and $R^5$ together with the carbon atom to which they are attached can be a member selected from the group consisting of cyclopentyl, cyclohexyl and a lower alkyl substituted cyclohexyl radical.

2. The compound 2,2-dimethylpenta-3,4-dien-1-ol.
3. The compound 2,2,5-trimethylhepta-3,4-dien-1-ol.
4. The compound 2,2-dimethylocta-3,4-dien-1-ol.
5. The compound 2,2-dimethyl-4-cyclohexylidene-3-butenol.
6. An allenic alcohol having the formula:

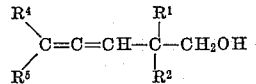

wherein $R^1$, $R^2$, $R^4$ and $R^5$ each represents a lower alkyl radical.

7. An allenic alcohol having the formula:

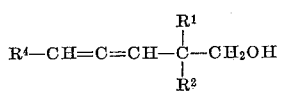

wherein $R^1$, $R^2$, and $R^4$ each represents a lower alkyl radical.

8. An allenic alcohol having the formula:

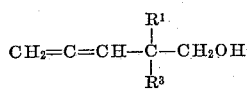

wherein $R^1$ and $R^2$ each represents a lower alkyl radical.

References Cited by the Examiner

UNITED STATES PATENTS

| | | | |
|---|---|---|---|
| 2,563,325 | 8/1951 | Fahnoe | 260—615 |
| 2,763,696 | 9/1956 | Finch et al. | 260—638 |
| 2,767,221 | 10/1956 | Ballard et al. | 260—638 |
| 2,947,786 | 8/1960 | Brannock | 260—615 X |
| 2,957,028 | 10/1960 | Brannock et al. | 260—601 |
| 3,057,888 | 10/1962 | Marbet et al. | 260—601 X |

OTHER REFERENCES

Braude et al., Chem. Abstract, vol. 47 (1953), page 1073h.

Herbertz, Chemische Berichte, vol. 92 (1959), pp. 541–550.

Wagner et al., "Synthetic Organic Reactions" (1953), p. 153.

LEON ZITVER, *Primary Examiner.*